(12) United States Patent
Lee

(10) Patent No.: US 11,473,687 B2
(45) Date of Patent: Oct. 18, 2022

(54) PLASTIC VALVE FOR PREVENTING DISTORTION

(71) Applicant: Sang Seon Lee, Wonju-si (KR)

(72) Inventor: Sang Seon Lee, Wonju-si (KR)

(*) Notice: Subject to any disclaimer, the term of this patent is extended or adjusted under 35 U.S.C. 154(b) by 0 days.

(21) Appl. No.: 17/192,745

(22) Filed: Mar. 4, 2021

(65) Prior Publication Data
US 2021/0190224 A1 Jun. 24, 2021

Related U.S. Application Data

(63) Continuation of application No. 16/199,066, filed on Nov. 23, 2018, now Pat. No. 10,962,132, which is a
(Continued)

(30) Foreign Application Priority Data

Jul. 20, 2016 (KR) .................. 10-2016-0092122
Jul. 20, 2016 (KR) .................. 10-2016-0092159
Jul. 20, 2016 (KR) .................. 10-2016-0092178

(51) Int. Cl.
F16K 27/00 (2006.01)
B29C 45/14 (2006.01)
F16L 23/032 (2006.01)
F16L 41/02 (2006.01)
F16L 47/14 (2006.01)
(Continued)

(52) U.S. Cl.
CPC .............. F16K 27/00 (2013.01); B29C 45/14 (2013.01); B29C 45/14467 (2013.01); F16L 23/032 (2013.01); F16L 41/021 (2013.01); F16L 47/14 (2013.01); F16L 57/00 (2013.01); B29K 2101/12 (2013.01); B29K 2309/08 (2013.01); B29L 2031/7506 (2013.01)

(58) Field of Classification Search
CPC ... F16K 27/00; B29C 45/14; B29C 45/14467; F16L 23/032; F16L 41/021; F16L 47/14; F16L 57/00; F16L 23/003; B29K 2101/12; B29L 2031/7506
See application file for complete search history.

(56) References Cited

U.S. PATENT DOCUMENTS 2,409,430 A  10/1946  Greenleaf
2,716,575 A   8/1955  Vickers.
(Continued)

FOREIGN PATENT DOCUMENTS

EP   0396151 A2 * 11/1990 .............. F16L 47/14
EP   2543491 A2 *  1/2013 .......... B29C 45/1642
(Continued)

Primary Examiner — Marina A Tietjen

(57) ABSTRACT

A plastic valve for preventing distortion is disclosed. The plastic valve comprises a connection member made up of plastic, a case member formed on an outer surface of the connection member, and a flange member made up of plastic and formed at an end part of the connection member. A pipe is connected by being inserted into a hole of a central part of the connection member and a distortion prevention member for minimizing a force corresponding to distortion applied in a direction opposed to a direction of the connection is formed in the flange member. The connection member is made up of fluoride resin and the case member is made up of engineering plastic.

4 Claims, 13 Drawing Sheets

Related U.S. Application Data continuation of application No. PCT/KR2017/007663, filed on Jul. 17, 2017.

(51) Int. Cl.
  *F16L 57/00* (2006.01)
  *B29K 101/12* (2006.01)
  *B29K 309/08* (2006.01)
  *B29L 31/00* (2006.01)

(56) References Cited

U.S. PATENT DOCUMENTS

| | | | |
|---|---|---|---|
| 3,082,022 A | 3/1963 | Moore | |
| 3,305,251 A | 2/1967 | Skinner | |
| 3,526,386 A | 9/1970 | Gachot | |
| 4,784,185 A * | 11/1988 | Friedrichs | F02M 35/10078 138/109 |
| 4,889,318 A | 12/1989 | Sisk | |
| 5,366,257 A | 11/1994 | McPherson et al. | |
| 5,505,525 A | 4/1996 | Denton | |
| 6,634,676 B1 * | 10/2003 | Lampson | B65D 90/24 220/601 |
| 6,979,028 B2 | 12/2005 | Muroi et al. | |
| 2005/0121913 A1 * | 6/2005 | Smahl | F16L 47/24 285/423 |
| 2013/0207377 A1 * | 8/2013 | Cavagna | F16L 25/02 285/47 |
| 2015/0059911 A1 * | 3/2015 | Petrov | B29C 65/561 138/172 |
| 2015/0174514 A1 * | 6/2015 | Lin | F16L 23/06 96/11 |
| 2016/0076682 A1 * | 3/2016 | Conrad | B29C 66/52241 285/21.1 |

FOREIGN PATENT DOCUMENTS

| | | |
|---|---|---|
| JP | 06-159573 A | 6/1944 |
| JP | 0805881 A | 3/1996 |
| JP | 11-336951 A | 12/1999 |
| JP | 2013-122285 A | 6/2013 |
| KR | 1998-037624 | 9/1998 |
| KR | 10-2012-0119653 A | 10/2012 |
| KR | 10-1324938 B1 | 11/2013 |

* cited by examiner

PLASTIC VALVE FOR PREVENTING DISTORTION

CROSS-REFERENCE TO RELATED APPLICATIONS

This application is a continuation application of U.S. application Ser. No. 16/199,066, which was filed on Nov. 23, 2018, and which is a continuation application of PCT application PCT/KR2017/007663, which was filed on Jul. 17, 2017, and which claims priority from Korean Patent Application No. 10-2016-0092122 filed with the Korean Intellectual Property Office on Jul. 20, 2016, Korean Patent Application No. 10-2016-0092159 filed with the Korean Intellectual Property Office on Jul. 20, 2016, and Korean Patent Application No. 10-2016-0092178 filed with the Korean Intellectual Property Office on Jul. 20, 2016. The disclosures of the above patent applications are incorporated herein by reference in their entirety.

BACKGROUND

1. Field of the Invention

The invention relates to a plastic valve capable of preventing distortion.

2. Description of the Related Art

A plastic value is made up of plastic, and has generally a structure of following FIG. 1.

FIG. 1 is a view illustrating a conventional plastic valve.

In FIG. 1, the plastic valve includes a connection member 100 made up of plastic and a flange member 102.

Distortion may be generated in a direction opposed to a connection direction when the plastic valves are combined, or the plastic valve is connected to a pipe of which a flange member is formed at an end. This distortion twists the pipe.

SUMMARY

The invention provides a plastic valve capable of preventing distortion.

According to one embodiment of the invention, a plastic valve comprises a connection member made up of plastic; and a flange member made up of plastic and formed at an end part of the connection member. Here, a metal member is formed in the flange member, and the metal member includes a body and at least one protrusion projected from the body in a direction of an end of the flange member.

According to another embodiment of the invention, a plastic valve comprises a connection member made up of plastic; and a flange member made up of plastic and formed at an end part of the connection member. Here, a pipe is connected by be inserted into a hole of a central part of the connection member, and a distortion prevention member for minimizing a force corresponding to distortion applied in a direction opposed to a direction of the connection is formed in the flange member.

According to one embodiment of the invention, a metal member formed in a flange member of a plastic valve comprises a body; and a protrusion projected from the body. Here, the protrusion is extended from the body in a direction of an end of the flange member.

According to one embodiment of the invention, a pipe comprises a flange member formed at an end part of the pipe. Here, a metal member is formed in the flange member, and the metal member includes a body and at least one protrusion projected from the body in a direction of an end of the flange member.

According to still another embodiment of the invention, a plastic valve comprises a core made up of plastic, a flare member being formed at one or more end parts of the core; and a flange member made up of plastic and formed at an end part of the core. Here, the flare member includes a protrusion projected in a direction of an outer surface of the flange member, and the protrusion is inclined.

According to still another embodiment of the invention, a plastic valve comprises a core made up of plastic, a flare member being formed on at least one end part of the core; and a flange member made up of plastic and formed at an end part of the core. Here, the flare member is formed by an insert molding so that step of the flare member and the flange member do not exist, and at least one groove for double combination with a pipe is formed on the flare member.

According to one embodiment of the invention, a pipe connection device comprises a connection member configured to include a body connected to a pipe and a protrusion formed at an end part of the body. Here, a flow path is formed through the body and the protrusion, a part connected to the pipe of an internal surface of the body has step from an internal surface of the protrusion, and s screw thread is formed on a part combined with the pipe of an internal surface of the body.

According to another embodiment of the invention, a pipe connection device comprises a connection member configured to include a body connected to a pipe and a protrusion formed at an end part of the body; and a flange member disposed at location corresponding to the protrusion or corresponding location between the body and the protrusion, outside of the connection member. Here, a flow path is formed through the body and the protrusion, and a part combined with the pipe of an internal surface of the body has step from an internal surface of the protrusion.

In a plastic valve of the invention, a metal member having a protrusion is formed in a flange member, and so distortion may not be generated to the plastic valve.

BRIEF DESCRIPTION OF DRAWINGS

The aspects, features, advantages and embodiments of the invention will be more apparent from the following detailed description taken in conjunction with reference to the accompanying drawings, in which.

DETAILED DESCRIPTION

In the present specification, an expression used in the singular encompasses the expression of the plural, unless it has a clearly different meaning in the context. In the present specification, terms such as "comprising" or "including," etc., should not be interpreted as meaning that all of the elements or operations are necessarily included. That is, some of the elements or operations may not be included, while other additional elements or operations may be further included. Also, terms such as "unit," "module," etc., as used in the present specification may refer to a part for processing at least one function or action and may be implemented as hardware, software, or a combination of hardware and software.

The invention relates to a plastic valve, and provides a plastic valve for preventing distortion by using a metal member. The metal member included in the plastic valve of the present embodiment can minimize a force for distorting the plastic valve.

Hereinafter, various embodiments of the invention will be described in detail with reference to accompanying drawings.

Figure 1:
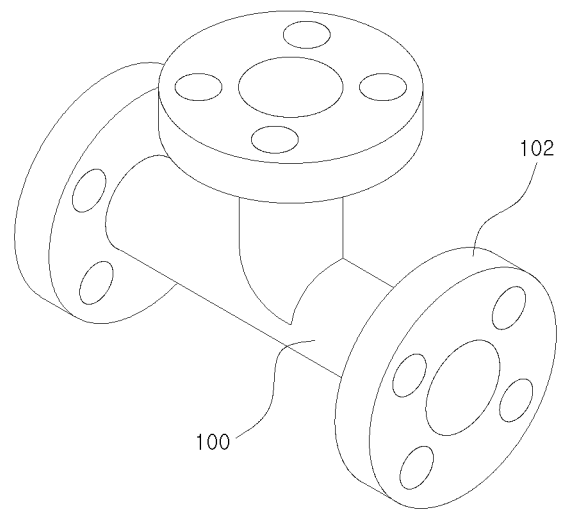
FIG. 1 is a view illustrating a conventional plastic valve.
Figure 2:
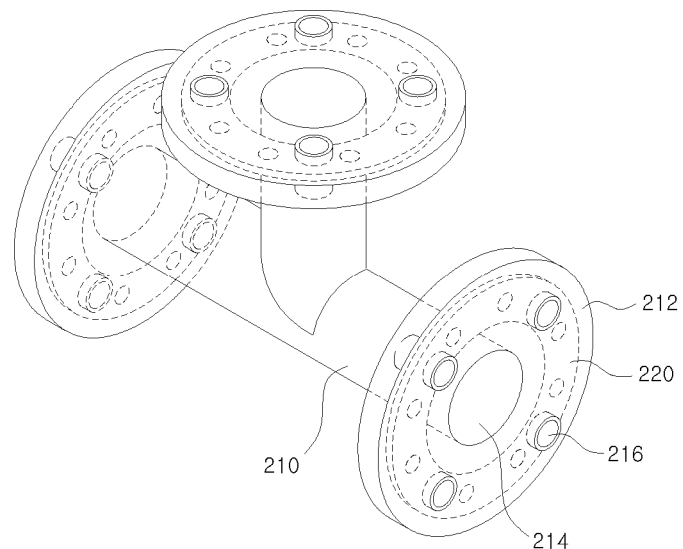
FIG. 2 is a perspective view illustrating a plastic valve according to a first embodiment of the invention.
Figure 3:
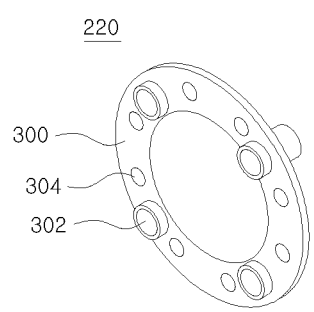
FIG. 3 is a view illustrating a metal member according to one embodiment of the invention.
Figure 4:
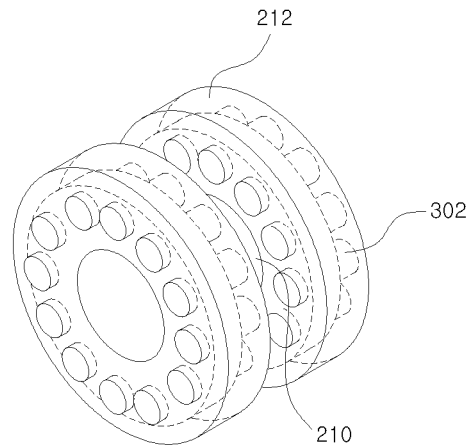
FIG. 4 is a view for describing effect of the plastic valve of the invention.
Figure 5:
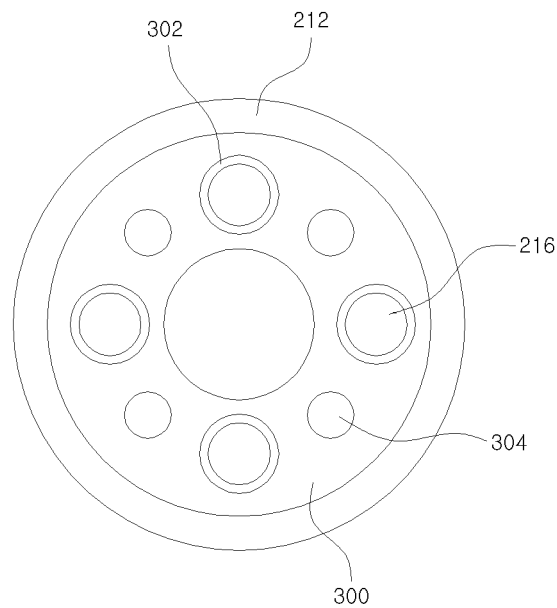
FIG. 5 and FIG. 6 are sectional views illustrating the plastic valve in FIG. 2.
Figure 6:
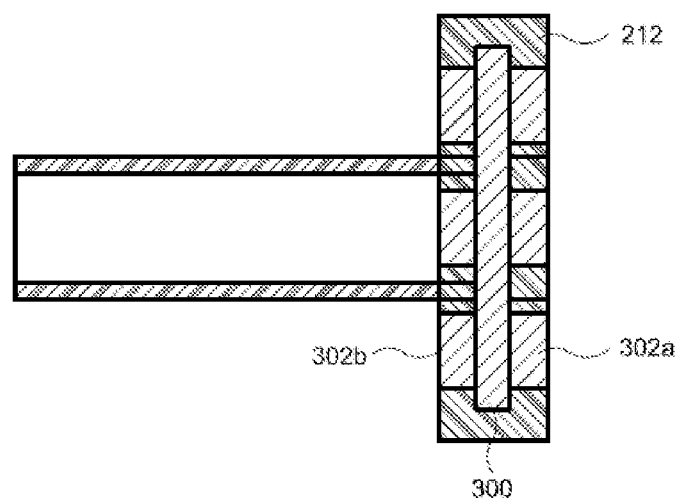
Figure 7:
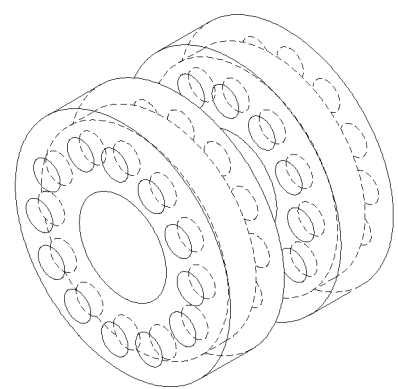
FIG. 7 is a perspective view illustrating a plastic valve compared with the plastic valve of the invention.
Figure 8:
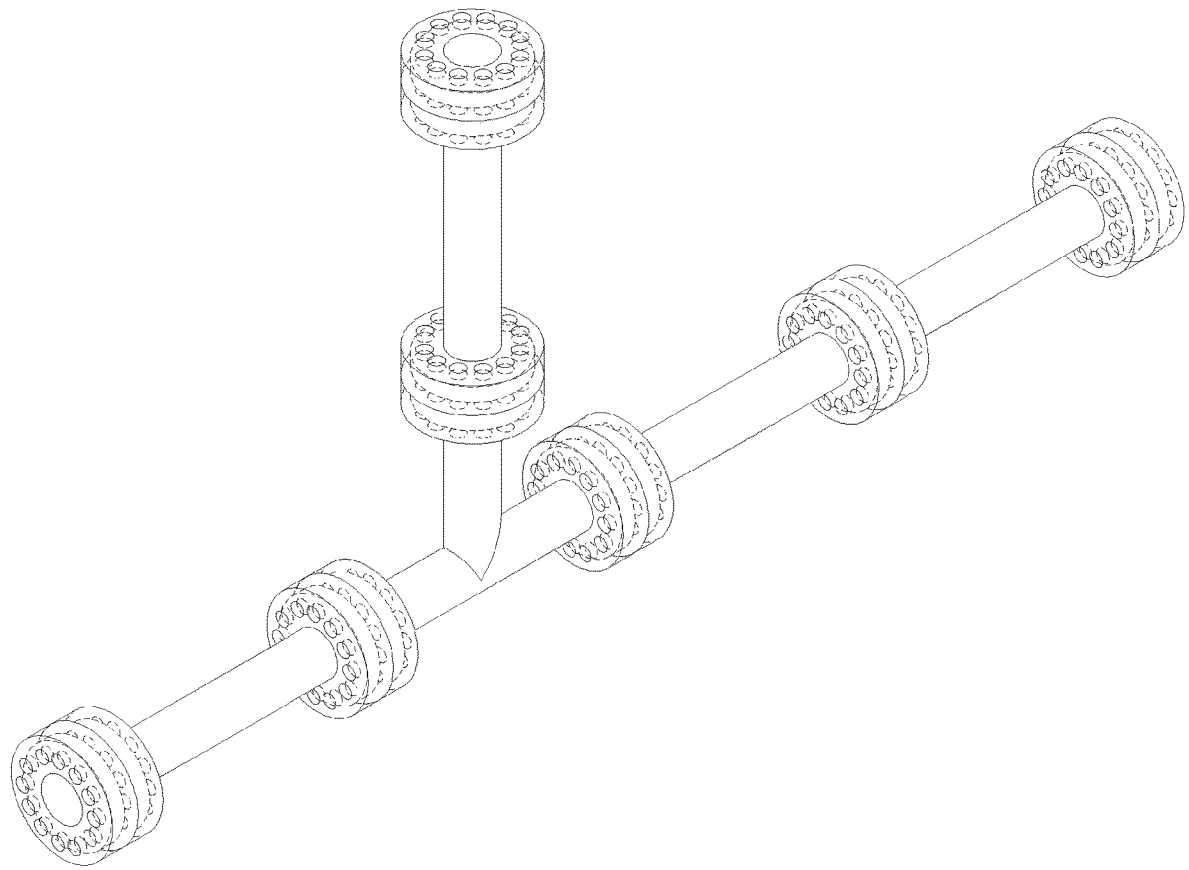
FIG. 8 is a view illustration a connection structure of a pipe.

FIG. 2 is a perspective view illustrating a plastic valve according to a first embodiment of the invention, FIG. 3 is a view illustrating a metal member according to one embodiment of the invention, and FIG. 4 is a view for describing effect of the plastic valve of the invention. FIG. 5 and FIG. 6 are sectional views illustrating the plastic valve in FIG. 2, FIG. 7 is a perspective view illustrating a plastic valve compared with the plastic valve of the invention, and FIG. 8 is a view illustration a connection structure of a pipe.

In FIG. 2, a plastic valve 200 of the present embodiment is made up of plastic material, and includes a connection member 210 and at least one flange member 212.

The connection member 210 connects pipes, a hole 214 into which the pipe is inserted being formed at a central part of the connection member 210.

The flange member 212 is formed at an end part of the connection member 210, and includes at least one hole 216. As shown in FIG. 8, the plastic valve 200 and another plastic valve may be combined by inserting a bolt into the hole 216 of the flange member 212 and a hole of a flange member of the another plastic valve while the flange member 212 and the flange member of the another plastic valve face each other, or the plastic valve 200 and a pipe of which a flange member is formed at an end part may be combined by inserting a bolt into the hole 216 of the flange member 212 and a hole of the flange member of the pipe while the flange member 212 and the flange member of the pipe face each other. That is, the hole 216 is used for connecting another plastic valve or the pipe to the plastic valve 200.

In one embodiment, the connection member 210 and the flange member 212 may be made up of fluoride resin. The fluoride resin means every resin comprising fluoride in molecule, and may be polytetrafluoroethylene (PTFE), Polychlorotrifluoroethylene (PCTFE) and so on, for example Tetra fluoro ethylene perfluoro alkylvinyl ether coppolymer, PFA. This fluoride resin has excellent heat-resisting property, chemical resistance and electric insulation. Slip coefficient of the fluoride resin is low and the fluoride resin does not have adhesion and stickiness.

A case member (not shown) is formed on an external surface of the connection member 210. The case member is made up of engineering plastic, and may be made up of polyphenylenethers resin composition comprising polyphenylenethers resin composition and polystyrene resin. Of course, the case member as the engineering plastic may be made up of POLYIMIDE, POLYSULFONE, POLY PHENYLENE SULFIDE, POLYAMIDE IMIDE, POLYACRYLATE, POLYETHER SULFONE, POLYETHER ETHER KETONE, POLYETHER IMIDE, LIQUID CRYSTAL POLYESTER, POLYETHER KETONE, etc. and their combination.

It is assumed that the case member is formed with plastic for convenience of description, but the case member may be formed with other material such as steel.

Hereinafter, the flange member 212 of the invention will be described in detail.

Referring to FIG. 2, FIG. 5 and FIG. 6, a metal member 220 having for example a circular shape may be included in the flange member 212, and so strength of the flange member 212 may be reinforced. On the other hand, the metal member 220 may be called as a distortion prevention member in that it prevents distortion of the plastic valve 100 as described below.

The metal member 220 has circular shape in drawings, but the metal member 220 may have various shapes such as a rectangular shape and so on. It is desirable that the metal member 220 has circular shape because the flange member 212 has circular shape.

In one embodiment, the metal member 220 may be formed in the flange member 212 through an insert molding. Particularly, the metal member 220 may be included in the flange member 212 by performing the insert molding after inserting the metal member 220 in plastic which is material for the flange member 212.

In this case, at least one hole 304 may be formed on a body 300 of the metal member 220, to form stably the metal member 220 in the flange member 212. In the insert molding, the hole 304 is filled with melted plastic, and thus the metal member 220 is strongly combined in the flange member 212.

In one embodiment, the metal member 220 may include the body 300, at least one protrusion 302 and at least one hole 304 as shown in FIGS. 3, 5 and 6.

The protrusion 302 may be projected in an end direction of the flange member 212 based on the body 300 as shown in FIG. 6.

Particularly, a protrusion 302a may be projected in a right direction (in FIG. 6) based on the body 300, and a protrusion 302b may be projected in a left direction on the basis of the body 300. Here, the protrusions 302a and 302b may be projected in an opposite direction based on the same point of the body 300.

A hole 216 may be formed through the protrusions 302a and 302b and corresponding body part. A bolt, etc. for connection may be inserted in the hole 216.

The protrusion 302a may be extended from the body 300 to one end of the flange member 212, and the protrusion 302b may be extended from the body 300 to the other end of the flange member 212. However, the protrusions 302a and 302b may not be projected outside of the flange member 212, but they may be projected up to the internal end surface of the flange member 212.

That is, the metal member 220 of the present embodiment includes the protrusions 302a and 302b as well as the body 300.

A metal member including a body without the protrusions 302a and 302b may be included in the flange member 212. In this case, distortion of the flange member 212 may occur in a direction opposed to the connection direction by a bolt, etc. as shown in FIG. 7.

However, if the metal member 220 including the protrusions 302a and 302b is used, a force corresponding to the distortion applied in the direction opposed to the connection direction be minimized by the protrusions 302a and 302b. As a result, the distortion may not be generated to the plastic valve 200.

The hole 304 formed on the body 300 combines strongly the metal member 220 with the flange member 212 as described above.

Briefly, in the plastic valve 200 of the invention, the metal member 220 including the protrusions 302a and 302b is formed in the flange member 212, and so the distortion of the plastic valve 200 may be prevented in a pipe connection process.

For example, a flange member may be formed at an end part of the pipe as shown in FIG. 8, and the flange member may be connected to the flange member 212 of the plastic valve 200 through the bolt, etc. The distortion in this connection process may be prevented by the metal member 220 including the protrusions 302a and 302b.

Specially, pipes may be twisted by distortion when the pipes are connected, if the metal member 212 does not exist. However, the distortion may not occur because the metal members including protrusions are formed in the flange member of the plastic valve and the flange member of the pipe. Accordingly, twisting may not occur though the pipes are connected as shown in FIG. 8.

In the event that the pipes through which gas or solution passes are connected by using the plastic valve 200, the gas or the solution may not be leaked because the distortion does not occur.

In above description, the metal member 220 including the protrusions 302a and 302b is formed in the flange member 212 of the plastic valve 200. However, a metal member including protrusions may be formed in a flange member of a pipe of which the flange member is formed at an end part. That is, the flange member of the pipe may have the same structure as the flange member 212 of the plastic valve 200.

Accordingly, it will be immediately obvious to those skilled in the art that the same structure may be applied to the flange member formed at the end part of the pipe though only the flange member of the plastic valve is described as following.

In FIG. 8, connection structure of pipes using the plastic valve 200 at a central part and connection structure of pipes at which flange members are formed are shown.

Figure 9:
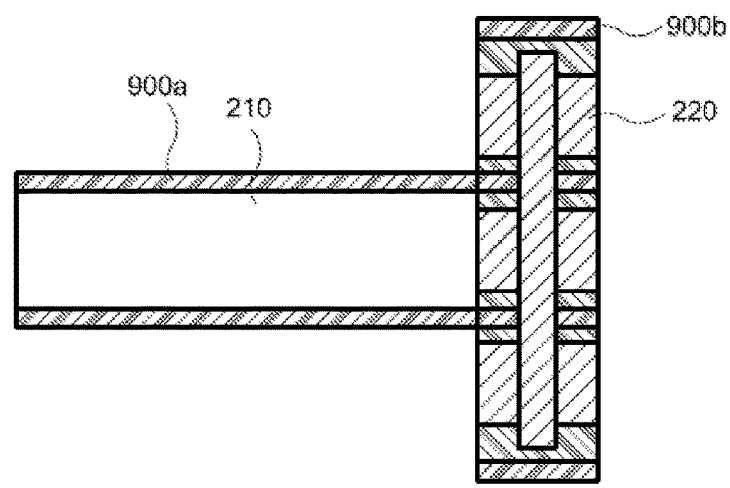
FIG. 9 is a sectional view illustrating a plastic valve according to a second embodiment of the invention.

FIG. 9 is a sectional view illustrating a plastic valve according to a second embodiment of the invention.

In FIG. 9, in the plastic valve of the present embodiment, case members 900a and 900b may be respectively formed on the connection member 210 and the flange member 212.

In one embodiment, the connection member 210 and the flange member 212 may be made up of fluoride resin, and the case members 900a and 900b may be made up of engineering plastic. For example, the case members 900a and 900b may be made up of polyphenylenethers resin composition including polyphenylenethers resin and polystyrene resin.

Of course, the case members 900a and 900b as the engineering plastic may be made up of POLYIMIDE, POLYSULFONE, POLY PHENYLENE SULFIDE, POLYAMIDE IMIDE, POLYACRYLATE, POLYETHER SULFONE, POLYETHER ETHER KETONE, POLYETHER IMIDE, LIQUID CRYSTAL POLYESTER, POLYETHER KETONE, etc. and their combination. If the case members 900a and 900b are formed with the engineering plastic, the plastic valve can be used at high temperature of 60° C. or higher, specially approximately 100° C.

In another embodiment, the connection member 210 and the flange member 212 may be made up of fluoride resin, and the case members 900a and 900b may be formed with mixture material generated by mixing glass fiber to Polyvinyl Chloride PVC, polypropylene PP, Poly Phenylene sulfide PPS or Polyphtalamide PPA.

Figure 10:
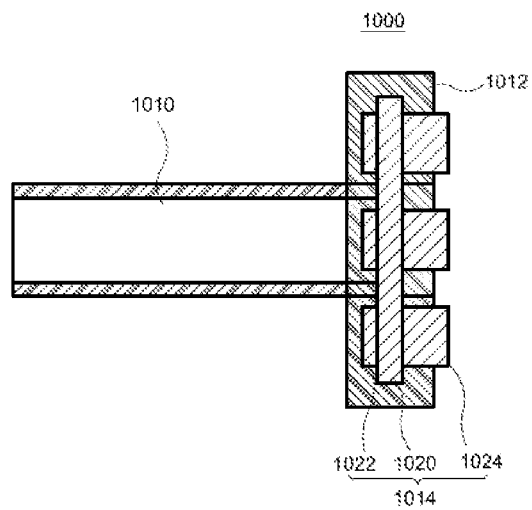
FIG. 10 is a view illustrating a plastic valve according to a third embodiment of the invention.
Figure 11:
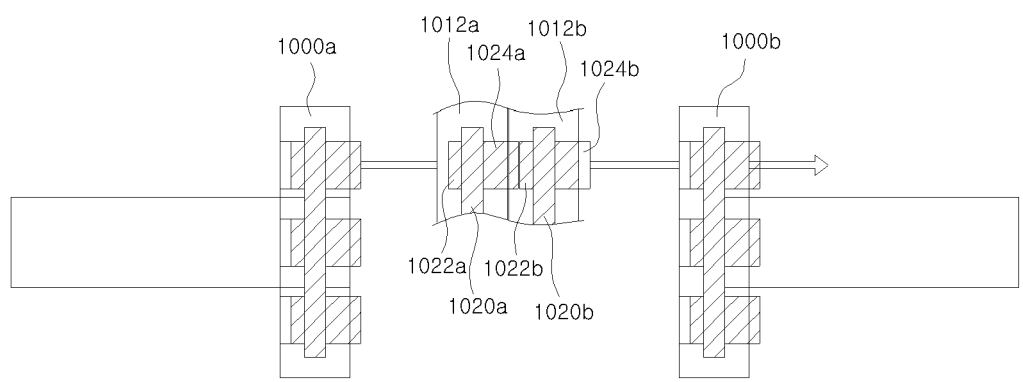
FIG. 11 is a view illustrating connection structure of the plastic valves in FIG. 10.

FIG. 10 is a view illustrating a plastic valve according to a third embodiment of the invention, and FIG. 11 is a view illustrating connection structure of the plastic valves in FIG. 10.

In FIG. 10, the plastic valve 1000 includes a connection member 1010 and a flange member 1012.

A metal member 1014 is formed in the flange member 1012.

The metal member 1014 may include a body 1020, a first protrusion 1022 and a second protrusion 1024.

Whole of the first protrusion 1022 is included in the flange member 1012 (dent state), and a part of the second protrusion 1024 is projected outside (protrusion state) of the flange member 1012. Here, the first protrusion 1022 and the second protrusion 1024 faces based on a specific portion of the body 1020, and the first protrusion 1022 is separated from an internal surface of the flange member 1012.

In one embodiment, the second protrusion 1024 may have higher length than the first protrusion 1022.

Referring to FIG. 11, a second protrusion 1024a of a first metal member in a first flange member 1012a of a first plastic valve 1000a may be inserted into a second flange member 1012b of a second plastic valve 1000b, when the plastic valves 1000a and 1000b are connected. In this case, the second protrusion 1024a of the first metal member in the first flange member 1012a may be contacted with a first protrusion 1022b in the second flange member 1012b of the second plastic valve 1000b. That is, the flange members 1012a and 1012b are connected by inserting a part projected outside of the first flange member 1012a of the second protrusion 1024a into the second flange member 1012b.

In above description, the flange member 1012a and 1012b of the plastic valves 1000a and 1000b are connected. However, a flange member of a plastic valve and a flange member of a pipe may be connected, or flange members of pipes may be combined. Here, the flange member of the pipe may have the same structure as the flange member of the plastic valve.

Figure 12:
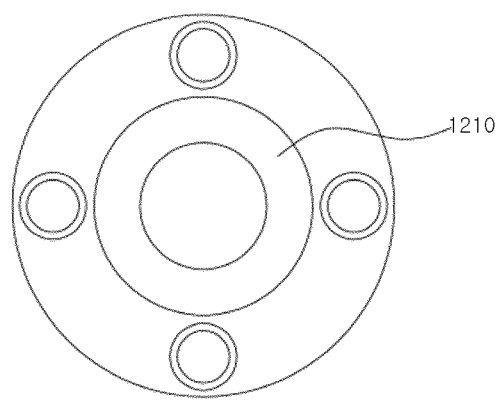
FIG. 12 is a side view illustrating a plastic valve according to one embodiment of the invention.
Figure 13:
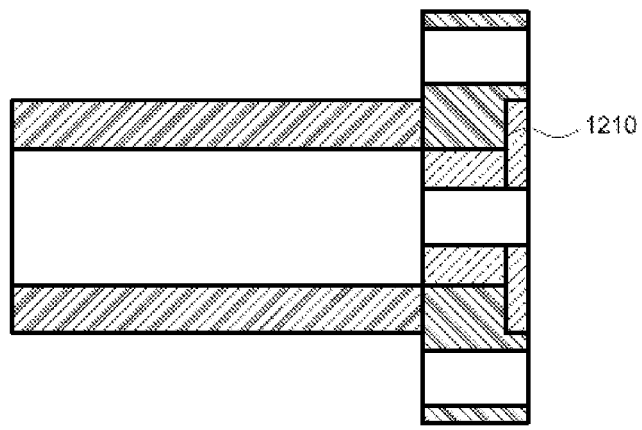
FIG. 13, FIG. 14 and FIG. 15 are sectional views illustrating a plastic valve according to one embodiment of the invention.

FIG. 12 is a side view illustrating a plastic valve according to one embodiment of the invention, and FIG. 13 is a front perspective view illustrating a plastic valve according to one embodiment of the invention. Hereinafter, detailed structure of the connection member 210 of the invention will be described.

In FIG. 12, a flare member 1210 is formed at an end part of the connection member 210.

The flare member 1210 is formed with the connection member 210 through the insert molding, and it is formed at the end part of the connection member 210. The flare member 1210 formed at the end part of the connection member 210 connects smoothly the pipe to the connection member 210 when the connection member 210 is connected to the pipe.

In a conventional technique, a flare member is formed by performing a hot-pressing process after forming a core through a molding process. Productivity becomes low by badness by a heat work and badness by reprocessing.

Since the flare member 1210 of the invention is formed with the connection member 210 through the insert molding, extra manufacture process for forming the flare member 1210 is not needed, and so productivity may be enhanced.

The flare member 1210 formed through the insert molding is included in the flange member 212. That is, the flare member 1210 may be formed so that step does not exist between the flare member 1210 and the flange member 212.

Accordingly, shape of the connection member 210 and the flare member 1210 is not exposed outside, thereby enhancing sealing of the plastic valve 200.

Figure 14:
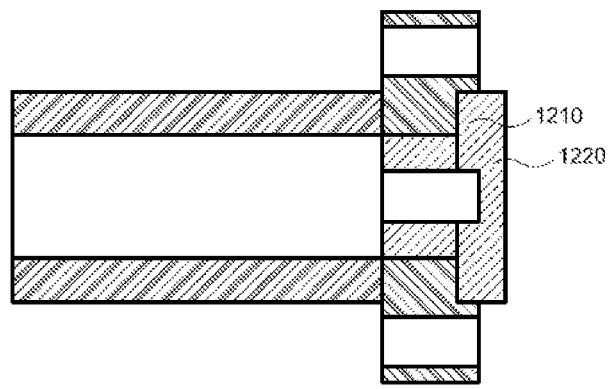

As shown in FIG. 14, the flare member 1210 according to another embodiment of the invention includes a protrusion 1220.

The protrusion 1220 is projected outside of the flange member 212.

Figure 16:
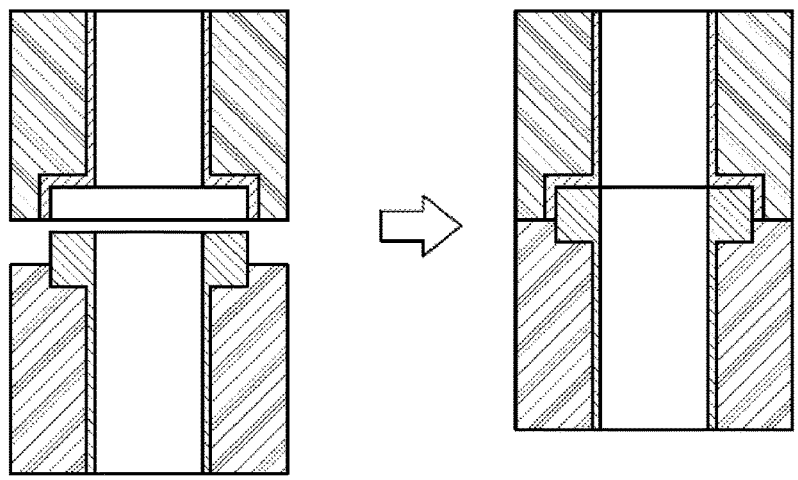
FIG. 16 and FIG. 17 are views illustrating combination of a plastic valve and a pipe.

The protrusion 1220 may function as a guide when the connection member 210 is connected to the pipe because the protrusion 1220 is formed at the end part of the flare member 1210. That is, the connection member 210 and the pipe may be easily connected according as the protrusion 1220 is inserted into a hole of the pipe (referring to FIG. 16).

Figure 15:
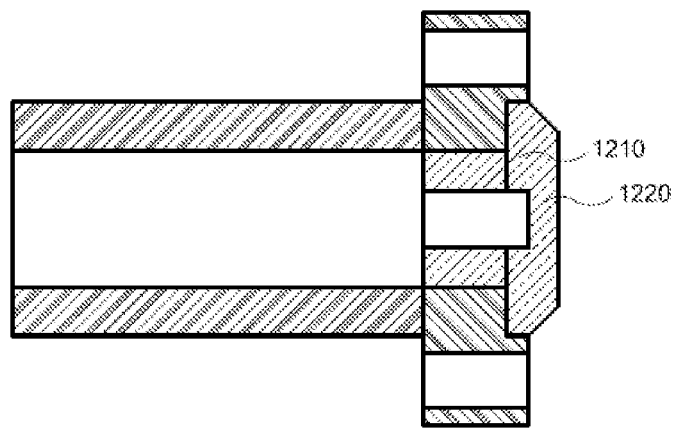

FIG. 15 is a view illustrating the protrusion according to another embodiment of the invention.

In FIG. 15, the protrusion 1220 may be formed with an inclination angle so that it is inclined in an opposite direction of the flange member 212.

Figure 17:
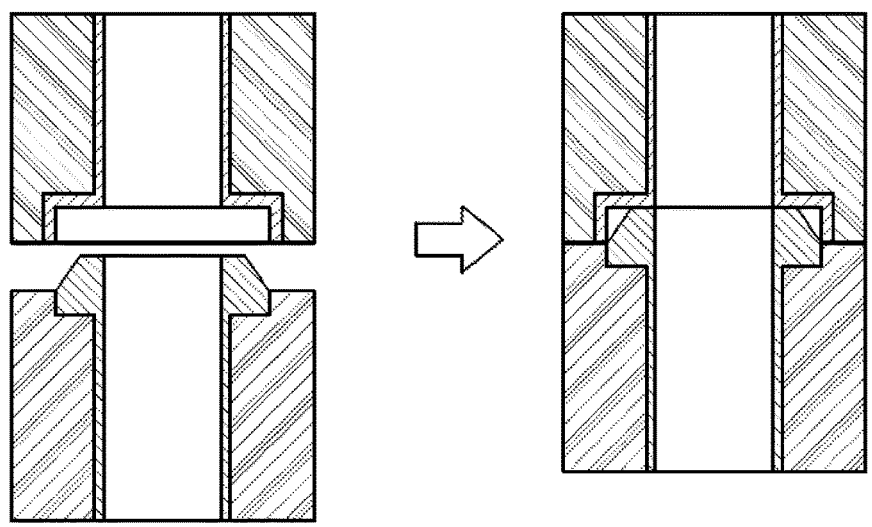

As a result, a diameter of a part contacted with the flange member 212 of the protrusion 1220 may be higher than that of outermost part of the protrusion 1220. That is, the diameter of the outermost part of the protrusion 1220 is smaller than the diameter of the part adjacent to the flange member 212, and thus the connection member 210 may be easily inserted into the pipe when the connection member 210 is combined with the pipe (FIG. 17).

At least one groove 1230 is formed on the flare member 1210 or the protrusion 1220.

Figure 18:
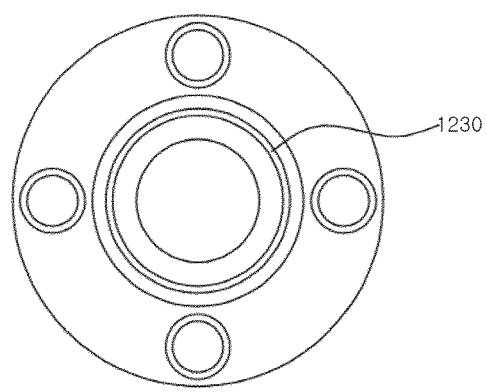
FIG. 18 and FIG. 19 are sectional views illustrating a plastic valve according to still another embodiment of the invention.

The groove 1230 formed on the flare member 1210 or the protrusion 1220 may be closely formed along an outer surface of the flare member 1210 or the protrusion 1220 (referring to FIG. 18).

Figure 19:
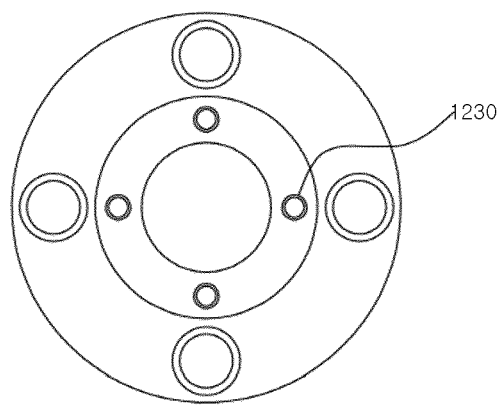

In another embodiment, the groove 1230 formed on the flare member 1210 or the protrusion 1220 may be formed in a circular shape having constant diameter, a polygonal shape such as a rectangular shape, etc. as shown in FIG. 19.

Figure 20:
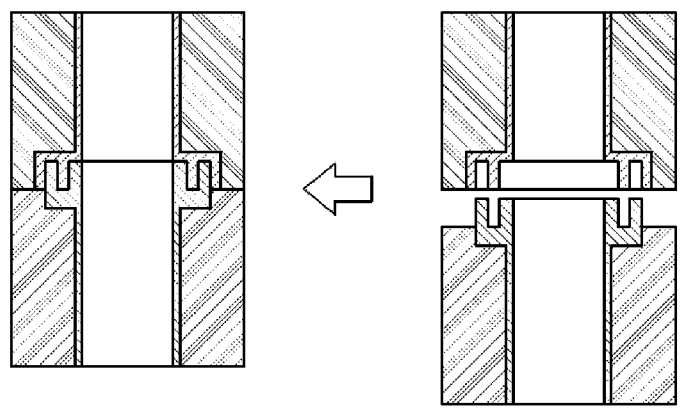
FIG. 20 is a view illustrating combination of a plastic valve and a pipe according to another embodiment of the invention.
Figure 21:
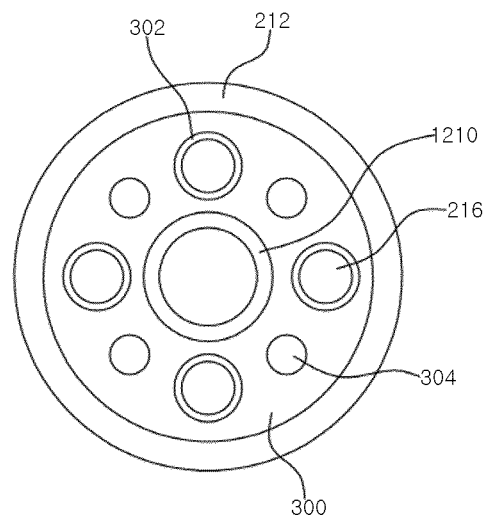
FIG. 21 and FIG. 22 are sectional views illustrating a plastic valve according to still another embodiment of the invention.

In the event that at least one groove 1230 is formed on the flare member 1210 or the protrusion 1220, the groove 1230 is combined with a protrusion of the pipe as shown in FIG. 20, and the protrusion 1220 is double combined by being inserted into a hole formed inside the pipe. Accordingly, the connection member 210 may be more strongly combined with the pipe.

In above description, detailed structure of the connection member 210 is described. Hereinafter, detailed structure of the flange member 212 for preventing distortion of the plastic valve 200 will be described.

The metal member 220 may be included in the flange member 212. As a result, strength of the flange member 212 may be reinforced.

The metal member 220 has the circular shape in FIG. 2 and FIG. 3, but the metal member 220 may have various shapes such as a rectangular shape, etc. It is desirable that the metal member 220 has the circular shape because the flange member 212 has the circular shape.

The metal member 220 may be included in the flange member 212 through the insert molding. Particularly, the metal member 220 may be included in the flange member 212 by performing the insert molding after inserting the metal member 220 into a plastic which is material of the flange member 212.

In this case, at least one hole 304 may be formed on the body 300 of the metal member 220, to combine strongly the metal member 220 in the flange member 212. The metal member 220 is strongly combined in the flange member 212 if melted plastic is filled in the hole 304 in the insert molding of the flange member 212.

As shown in FIG. 3 and FIG. 13, the metal member 220 includes a body 300, at least one protrusion 302 and one or more holes 304.

Figure 22:
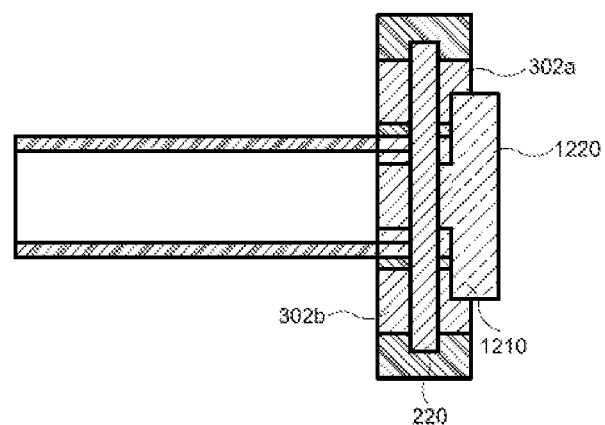

The protrusion 302 may be projected in the end direction of the flange member 212 based on the body 300 as shown in FIG. 22.

Particularly, the protrusion 302a may be projected in a right direction based on the body 300 (FIG. 22), and the protrusion 302b may be projected in a left direction based on the body 300. Here, the protrusions 302a and 302b may be projected in an opposite direction based on a specific point of the body 300.

A hole 216 may be formed through the protrusions 302a and 302b and corresponding part of the body. A bolt, etc. for connection may be inserted into the hole 216.

The protrusion 302a may be longitudinally extended from the body 300 to one end of the flange member 212, and the protrusion 302b may be longitudinally extended from the body 300 to another end of the flange member 212. Here, the protrusions 302a and 302b are not projected outside of the flange member 212 and may be projected to the end, i.e. surface of the flange member 212.

That is, the metal member 220 of the present embodiment includes the protrusions 302a and 302b as well as the body 300.

A metal member including a body without the protrusions 302a and 302b may be included in the flange member 212. In this case, distortion of the flange member 212 may occur in a direction opposed to the connection direction by the bolt, etc.

However, if the metal member 220 including the protrusions 302a and 302b is used, a force corresponding to the distortion applied in a direction opposed to the connection direction is minimized by the protrusions 302a and 302b. As a result, the distortion is not generated to the plastic valve 200.

The holes 304 formed on the body 300 combines strongly the metal member 220 in the flange member 212.

Briefly, in the plastic valve 200 of the present embodiment, the metal member 220 including the protrusions 302a and 302b is formed in the flange member 212, and thus the distortion of the plastic valve 200 generated in a pipe connection process may be prevented.

For example, a flange member may be formed at an end part of a pipe as shown in FIG. 17, and the flange member may be connected to the flange member 212 of the plastic valve 200 through a bolt, etc. The distortion generated in this connection process may be prevented by the metal member 220 including the protrusions 302a and 302b.

Specially, if the metal member 220 does not exist, the pipes may be twisted due to distortion when the pipes are connected. However, since the metal member including the protrusions is formed in the flange member of the plastic valve 200 and the flange member formed at the end part of the pipe, the distortion may not occur. Accordingly, twist may not occur though the pipes are connected, as shown in FIG. 8.

If the pipes through which gas or solution flows are connected by using the plastic valve 200, the distortion is not occurred, and so the gas or the solution may not be leaked.

In above description, the metal member 220 including the protrusions 302a and 302b is formed in the flange member 212 of the plastic valve 200. However, a metal member including protrusions may be formed in a flange member of a pipe of which the flange member is formed at an end part. That is, the flange member of the pipe may have the same structure as the flange member 212 of the plastic valve 200.

Accordingly, it will be immediately obvious to those skilled in the art that the same structure may be applied to the flange member formed at the end part of the pipe though only the flange member of the plastic valve is described as following.

Figure 23:
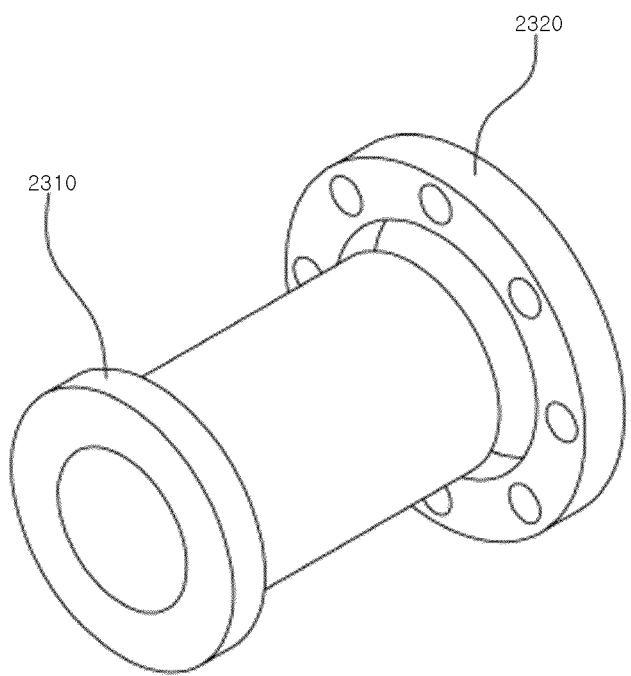
FIG. 23 is a view illustrating a conventional pipe connection device.
Figure 24:
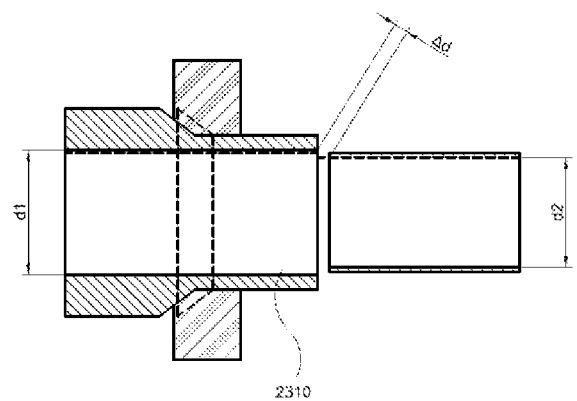
FIG. 24 is a sectional view illustrating a conventional pipe connection device.

A pipe connection device is combined with the pipe made up of plastic as shown in FIG. 23, so that the pipe is connected to another pipe or the plastic valve made up of plastic.

In FIG. 23, the pipe connection device combined with the end part of the pipe includes a stub end member 2310 and a flange member 2320. The stub end member 2310 is directly combined with the pipe by an adhesive. An external diameter of the pipe is the same as an internal diameter of the stub end member 2310 because the stub end member 2310 is directly combined with the pipe, and thus a step is generated on a flow path by a thickness of the pipe. Accordingly, flowing of a fluid is downed in the flow path and the pipe may be broken.

Figure 25:
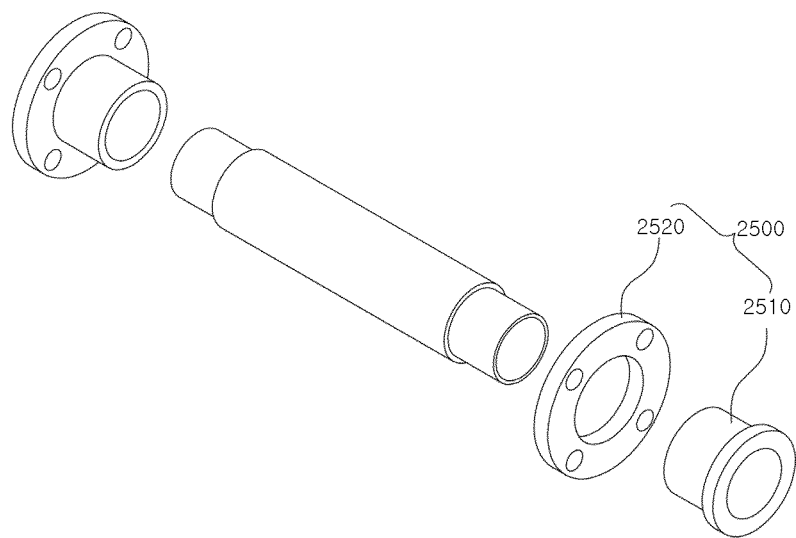
FIG. 25 is a view illustrating the pipe connection device according to one embodiment of the invention.
Figure 26:
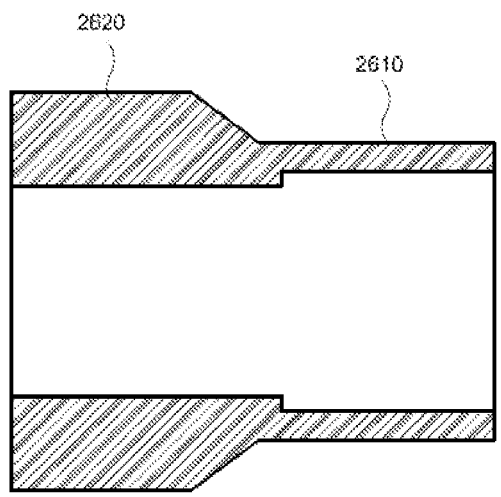
FIG. 26 is a sectional view illustrating a pipe connection device according to one embodiment of the invention.
Figure 27:
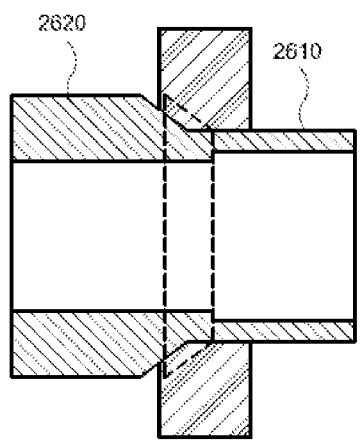
FIG. 27 is a view illustrating combination of a connection member and a flange member according to one embodiment of the invention.
Figure 28:
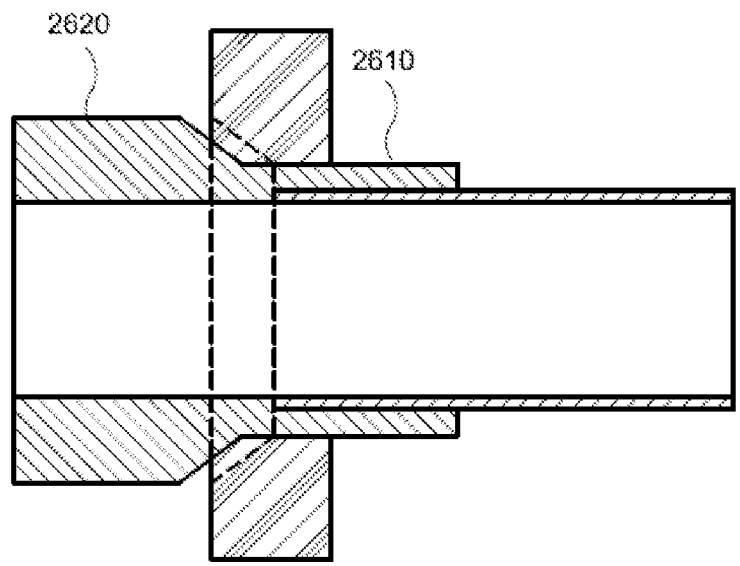
FIG. 28 is a view illustrating combination structure of the pipe connection device and the pipe according to one embodiment of the invention.
Figure 29:
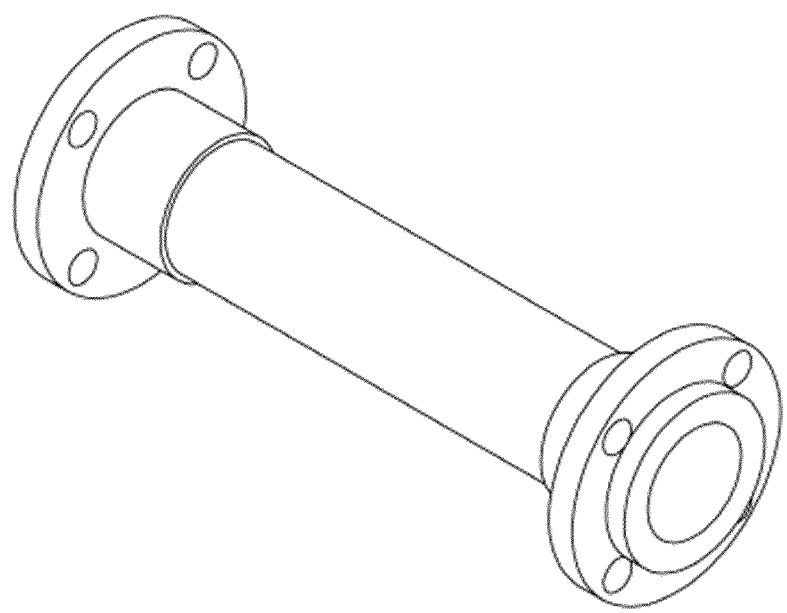
FIG. 29 is a view illustrating connection of pipes according to one embodiment of the invention.

FIG. 25 is a view illustrating the pipe connection device according to one embodiment of the invention, FIG. 26 is a sectional view illustrating a pipe connection device according to one embodiment of the invention, and FIG. 27 is a view illustrating combination of a connection member and a flange member according to one embodiment of the invention. FIG. 28 is a view illustrating combination structure of the pipe connection device and the pipe according to one embodiment of the invention, and FIG. 29 is a view illustrating connection of pipes according to one embodiment of the invention.

In FIG. 25, a pipe connection device 2500 combined with an end of a pipe according to the present embodiment includes a connection member 2510 and a flange member 2520.

The connection member 2510 is made up of plastic and is combined with an end part of the pipe. That is, the pipe is directly inserted into the connection member 2510.

The connection member 2510 includes a body 2610 and a protrusion 2620 as shown in FIG. 26.

A flow path is formed through the body 2610 and the protrusion 2620. The flow path formed at the body 2610 and the protrusion 2620 has internally a step to prevent generation of vortex.

The vortex may be generated by causes such as energy delivery, velocity, etc. when fluid flows in the flow path. Specially, the vortex may be generated by partial velocity difference of fluid when obstacle for disturbing fluid flowing exists in the flow path.

The vortex may reduce life of the pipe connection device 2500 by affecting to the pipe connection device 2500. Accordingly, the pipe connection device 2500 has structure capable of preventing generation of the vortex by flowing smoothly the fluid through removal of the obstacle.

The vortex is not generated because the obstacle disturbing fluid flowing does not exist in the flow path of the pipe connection device 2500, and thus life of the pipe connection device 2500 may increase.

In FIG. 26, the body 2610 is a part into which the pipe is directly inserted.

As shown in FIG. 26, the flow path is formed via the body 2610 and the protrusion 2620, and a part combined with the pipe of internal surfaces of the body 2610 has step from an internal surface of the protrusion 2620.

That is, a diameter of the internal surface (internal diameter) of the body 2610 is higher than that of the protrusion 2620.

Here, the body 2610 is a part combined with the pipe, and the internal diameter of the body 2610 may be the same as external diameter of the pipe.

If the internal diameter of the body 2610 is higher than the external diameter of the pipe, the pipe is separated from the body 2610 or fluid flowing through a flow path of the pipe is leaked outside though the pipe is inserted into the body 2610.

Accordingly, it is desirable that the internal diameter of the body 2610 is the same as the external diameter of the pipe.

The protrusion 2620 formed at an end of the body 2610 has tapered in certain angle based on the body 2610.

An internal diameter of the protrusion 2620 is the same as that of the pipe.

That is, the step is not generated on the flow path formed in the body 2610 and the protrusion 2620 according as the internal diameter of the protrusion 2620 is the same as that of the pipe.

Particularly, the step is formed at internal space of the body 2610 and adjacent protrusion 2620, while the pipe is not combined.

As shown in FIG. 28, in the event that the pipe is inserted into the body 2610, the step is not generated on a flow path in the connection member 2510 formed through the pipe because the internal diameter of the pipe is the same as that of the protrusion 2620.

Shortly, the pipe connection device 2500 of the invention may prevent the vortex when it is combined with the pipe, thereby reducing damage of the pipe and the pipe connection device 2500.

The body 2610 and the protrusion 2620 of the connection member 2510 may be simultaneously formed by using the insert molding.

The connection member 2510 may be made up of fluoride resin. The fluoride resin means every resin comprising fluoride in molecule, and may be polytetrafluoroethylene (PTFE), Polychlorotrifluoroethylene (PCTFE) and so on, for example Tetra fluoro ethylene perfluoro alkylvinyl ether coppolymer, PFA. This fluoride resin has excellent heat-resisting property, chemical resistance and electric insulation. Slip coefficient of the fluoride resin is low and the fluoride resin does not have adhesion and stickiness. That is, if the connection member 2510 is formed with the fluoride resin, change of flow velocity in the flow path in accordance with laminar flow may be minimized because the slip coefficient of the connection member 2510 is low.

The flange member 2520 is made up of plastic, and includes one or more holes 216.

The flange member 2520 is combined with an external surface of the connection member 2510.

Internal hole of the flange member 2520 is tapered with certain angle. Accordingly, the flange member 2520 may be combined with the protrusion 2620 of the connection member 2510 so that it is closely contacted with the outer surface of the protrusion 2620. As a result, the internal hole of the flange member 2520 is tapered with the angle so that an end surface of the protrusion 2620 of the connection member 2510 is not projected outside of the flange member 2520.

FIG. 27 shows an example of combination structure of the flange member 2520 and the connection member 2510. The protrusion 2620 is projected outside of the flange member 2520 based on the flange member 2520, but it may be formed not to be projected because it is closely contacted with the end surface of the flange member 2520.

The flange member 2520 may be formed with fluoride resin like the connection member 2510.

The metal member 220 may be included in the flange member 2520, to prevent distortion of the flange member 2520 made up of plastic. As a result, strength of the flange member 2520 may be reinforced.

The metal member 220 in FIG. 3 has circular shape, but it may have various shapes such as a rectangular shape and so on. It is desirable that the metal member 220 has circular shape because the flange member 2520 has circular shape.

The metal member 220 may be included in the flange member 2520 through insert molding. Particularly, the metal member 220 may be included in the flange member 2520 if the insert molding is performed after inserting the metal member 220 in plastic which is material of the flange member 2520.

At least one hole 304 may be formed on the body 300 of the metal member 220, to combine strongly the metal member 220 in the flange member 2520. The metal member 220 is strongly combined in the flange member 2520 if melted plastic is filled in the hole 304 in the insert molding of the flange member 2520.

Structure of the metal member 220 is shown in FIG. 3. Now referring to FIG. 3, the metal member 220 includes the body 300, at least one protrusion 302 and at least one hole 304.

As described above, the protrusion 302 may be projected in the end direction of the flange member 2520 based on the body 300 as shown in FIG. 3.

The hole 216 may be formed through the protrusions 302a and 302b and corresponding body. The bolt for connection may be inserted into the hole 216.

The protrusion 302a may be extended from the body 300 to one end of the flange member 2520, and the protrusion 302b may be extended from the body 300 to another end of the flange member 2520. Here, the protrusions 302a and 302b are not projected outside of the flange member 2520, but may be projected to the end, i.e. surface of the flange member 2520.

The flange member 2520 may include a metal member not including the protrusions 302a and 302b, but this causes distortion of the flange member 2520 in a direction opposed to the connection direction by the bolt, etc.

However, if the metal member 220 including the protrusions 302a and 302b is used, a force corresponding to the distortion applied in the direction opposed to the connection direction is minimized by the protrusions 302a and 302b. Accordingly, the distortion may not be generated at the flange member 2520 (referring to FIG. 29).

Figure 30:
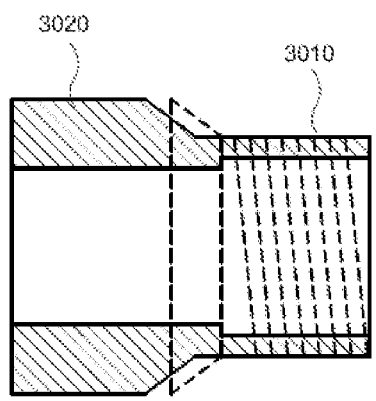
FIG. 30 is a view illustrating a pipe connection device according to another embodiment of the invention.
Figure 31:
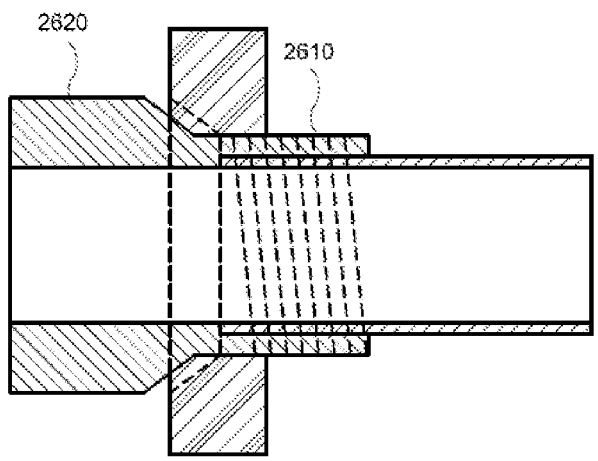
FIG. 31 is a view illustrating connection of a pipe connection device and a pipe according to another embodiment of the invention.

FIG. 30 is a view illustrating a pipe connection device according to another embodiment of the invention, and FIG. 31 is a view illustrating connection of a pipe connection device and a pipe according to another embodiment of the invention.

In FIGS. 30 and 31, the pipe connection device of the present embodiment includes a connection member 2510 and a flange member 2520.

The connection member 2510 includes a body 3010 and a protrusion 3020 like the connection member 2510 in FIG. 25. A flow path is formed through the body 3030 and the protrusion 3020, and a part combined with the pipe of internal surfaces of the body 3010 has step from an internal surface of the protrusion 3020.

Screw thread is formed on at least partial of the part combined with the pipe of the internal surface of the body 3010.

An internal diameter of the body 3010 having the screw thread is the same as an external diameter of the pipe of which screw thread is formed on an outer part, like in FIG. 25. The body 3010 having the screw thread may have the same length as the screw thread of the pipe.

The pipe may be combined with the body 3010 by rotating the pipe in a direction of the screw thread because the screw thread is formed on the internal surface of the body 3010, and thus convenience may be enhanced.

The protrusion 3020 has step from the internal diameter of the body 3010, like in FIG. 25.

That is, the internal diameter of the protrusion 3020 is the same as the internal diameter of the pipe.

As a result, the internal diameter of the protrusion 3020 and the internal diameter of the body 3010 have step by difference of the internal diameter and the external diameter of the pipe.

The pipe is inserted into the body 3010. In this case, the flow path in the pipe is extended without step by the protrusion 3020, and so vortex may be prevented.

The flange member 2520 is made up of plastic, and locates outside of the connection member 2510. The flange member 2520 is tapered in certain angle.

The flange member 2520 may include the metal member 220, to prevent distortion of the pipe when pipes made up of plastic are combined, like in FIG. 25. Any further description concerning the flange member 2520 is omitted because it likes in FIG. 25.

FIG. 31 shows an example of combination structure of the pipe connection device and the pipe. As shown in FIG. 31, screw thread is formed on the body 2610 of the connection member 2510 and screw thread is formed on an end part of the pipe, and thus the pipe is easily connected to the body 2610 without using adhesive. etc.

The internal diameter of the protrusion 2620 of the connection member 2610 may be the same as that of the pipe, and thus the step is not formed on the flow path extended from the pipe. Accordingly, vortex may not be generated.

The embodiments of the invention described above are disclosed only for illustrative purposes. A person having ordinary skill in the art would be able to make various modifications, alterations, and additions without departing from the spirit and scope of the invention, but it is to be appreciated that such modifications, alterations, and additions are encompassed by the scope of claims set forth below.

What is claimed is:

1. A pipe connection device comprising:
   a connection member made up of plastic;
   a case member formed on an outer surface of the connection member; and
   a flange member made up of plastic and formed at an end part of the connection member,
   wherein a pipe is connected by being inserted into a hole of a central part of the connection member, a distortion prevention member for minimizing a force corresponding to distortion applied in a direction opposed to a direction of the connection is formed in the flange member,
   wherein the connection member is made up of fluoride resin and the case member is made up of engineering plastic,
   wherein the distortion prevention member is formed in the flange member through an insert molding, at least one first hole is formed on the distortion prevention member into which melted plastic is filled by the insert molding to combine the distortion prevention member with the flange member, and at least one second hole is formed on the distortion prevention member into which a bolt is inserted to connect the flange member to another flange member, and
   wherein the at least one first hole is not formed in the connection member.

2. The pipe connection device of claim 1, wherein the distortion prevention member includes a metal member, and the metal member includes a body and at least one protrusion projected from the body for minimizing the force corresponding to the distortion.

3. The pipe connection device of claim 2, wherein the protrusion is extended from the body in a direction of an end of the flange member.

4. The pipe connection device of claim 1, wherein the distortion prevention member further includes a first protrusion and a second protrusion projected from the body in an opposite direction,
   wherein the first protrusion exists in the flange member, and a part of the second protrusion exists outside of the flange member,
   wherein a length of the second protrusion is higher than a length of the first protrusion.

* * * * *